US012802261B2

(12) United States Patent
Oka

(10) Patent No.: US 12,802,261 B2
(45) Date of Patent: Nov. 17, 2026

(54) VEHICLE POSITION ESTIMATION SYSTEM AND GENERATION METHOD FOR GENERATING LEARNED MODEL

(71) Applicant: TOYOTA JIDOSHA KABUSHIKI KAISHA, Toyota (JP)

(72) Inventor: Yuhei Oka, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 269 days.

(21) Appl. No.: 18/661,908

(22) Filed: May 13, 2024

(65) Prior Publication Data

US 2025/0022163 A1 Jan. 16, 2025

(30) Foreign Application Priority Data

Jul. 10, 2023 (JP) ................................ 2023-113115

(51) Int. Cl.
*G06T 7/73* (2017.01)
*G06V 10/44* (2022.01)

(52) U.S. Cl.
CPC ................ *G06T 7/73* (2017.01); *G06V 10/44* (2022.01); *G06T 2207/20081* (2013.01); *G06T 2207/30252* (2013.01)

(58) Field of Classification Search
CPC .. G06T 7/73; G06T 2207/20081; G06V 10/44
See application file for complete search history.

(56) References Cited

U.S. PATENT DOCUMENTS

| | | | | |
|---|---|---|---|---|
| 10,319,094 | B1 * | 6/2019 | Chen | G06F 16/5838 |
| 10,832,400 | B1 * | 11/2020 | Tang | G06V 10/87 |
| 11,270,168 | B1 * | 3/2022 | Otten | G06F 16/55 |
| 11,410,429 | B2 * | 8/2022 | Suzuki | G01C 21/34 |
| 11,545,034 | B2 * | 1/2023 | Pfadler | G08G 1/162 |
| 11,836,933 | B2 * | 12/2023 | Chumerin | G06T 7/292 |
| 2014/0348390 | A1 * | 11/2014 | Liu | G06V 20/54 382/104 |
| 2016/0148072 | A1 * | 5/2016 | Chan | G06V 20/54 382/104 |
| 2019/0220997 | A1 * | 7/2019 | Asai | G01C 21/28 |

(Continued)

FOREIGN PATENT DOCUMENTS

| | | | |
|---|---|---|---|
| JP | 2016-184316 | A | 10/2016 |
| JP | 2021-189910 | A | 12/2021 |

*Primary Examiner* — Mohammed H Zuberi
(74) *Attorney, Agent, or Firm* — Oliff PLC

(57) ABSTRACT

A vehicle position estimation system comprises one or more processors configured to estimate a position of a target vehicle shown in an image captured by a camera. The vehicle position estimation system extracts a universal feature point and a plurality of types of unique feature points from the captured image using a trained model. The universal feature point is a feature point independent of vehicle type. Each of the plurality of types of unique feature points is a feature point corresponding to each of a plurality of applicable vehicle types. The vehicle position estimation system selects a target unique feature point from the plurality of types of unique feature points according to the vehicle type of the target vehicle. Then, the vehicle position estimation system estimates the position of the target vehicle based on image coordinates of the universal feature point and the target unique feature point.

5 Claims, 6 Drawing Sheets

(56) References Cited

U.S. PATENT DOCUMENTS

| | | | | |
|---|---|---|---|---|
| 2021/0312209 | A1* | 10/2021 | Ye | G06F 18/253 |
| 2022/0027642 | A1* | 1/2022 | Shambik | G06T 7/73 |
| 2023/0047094 | A1* | 2/2023 | Zhao | G06T 7/70 |
| 2024/0175707 | A1* | 5/2024 | Okuma | G01C 21/3822 |
| 2025/0022375 | A1* | 1/2025 | Park | G08G 1/167 |
| 2025/0308244 | A1* | 10/2025 | Kakuma | G06V 10/87 |

* cited by examiner

VEHICLE POSITION ESTIMATION SYSTEM AND GENERATION METHOD FOR GENERATING LEARNED MODEL

CROSS-REFERENCE TO RELATED APPLICATION

The present disclosure claims priority to Japanese Patent Application No. 2023-113115, filed on Jul. 10, 2023, the contents of which application are incorporated herein by reference in their entirety.

TECHNICAL FIELD

The present disclosure relates to a technique for estimating a position of a vehicle.

BACKGROUND ART

Various techniques for improving the accuracy of estimating the position of a vehicle have been proposed. For example, Patent Literature 1 discloses a technique for estimating relative positions and attitudes between a plurality of vehicles with high accuracy even when it is difficult to use a GPS satellite signal. In addition, the following Patent Literature 2 is a document showing the technical level of the present technical field.

LIST OF RELATED ART

Patent Literature 1: JP 2021189910 A
Patent Literature 2: JP 2016184316 A

SUMMARY

Regarding techniques for estimating the position of a vehicle, there is a need for a technique of estimating the position of a vehicle shown in an image captured by a camera. For example, the estimated position of a vehicle shown in an image captured by the camera can be used in functions such as an auto valet parking (AVP) system, an autonomous driving system, a connected service, and the like. However, conventionally, it has not been possible to obtain the estimated position with sufficient accuracy.

An object of the present disclosure is, in the view of the above problems, to provide a technique capable of improving estimation accuracy of estimating a position of a vehicle in an image captured by a camera.

A first aspect of the present disclosure is directed to a vehicle position estimation system.

The vehicle position estimation system comprises:

a camera; and one or more processors configured to estimate a position of a target vehicle shown in an image captured by the camera.

The one or more processors are configured to execute:

extracting a universal feature point and a plurality of types of unique feature points from the captured image using a trained model generated in advance by machine learning, the universal feature point being a feature point independent of vehicle type, each of the plurality of types of unique feature points being a feature point corresponding to each of a plurality of applicable vehicle types;

acquiring information on the vehicle type of the target vehicle;

selecting a target unique feature point from the plurality of types of unique feature points according to the vehicle type of the target vehicle; and estimating the position of the target vehicle based on image coordinates of the universal feature point and the target unique feature point.

A second aspect of the present disclosure is directed to a generation method for generating a trained model for causing a computer to extract a feature point of a vehicle shown in a target image.

The trained model includes:

an upper layer that receives the target image as input;

a universal feature point extraction layer that receives an output of the upper layer as input and outputs the feature point of the vehicle; and a plurality of unique feature point extraction layers corresponding to a plurality of applicable vehicle types, each of which receives the output of the upper layer as input and outputs the feature point of the vehicle.

The generation method includes:

training the upper layer and the universal feature point extraction layer by using first training data, the first training data configured of a plurality of images showing various vehicles without specifying vehicle type; and training each of the plurality of unique feature point extraction layers by using second training data, the second training data configured of a plurality of images showing vehicles of the corresponding applicable vehicle type.

According to the present disclosure, it is possible to estimate the position of the target vehicle by using the image coordinates of the target unique feature point optimized for the vehicle type of the target vehicle in addition to the universal feature point. Thereby, it is possible to improve estimation accuracy.

DETAILED DESCRIPTION

1. First Embodiment

1.1 Vehicle Position Estimation System

Figure 1:
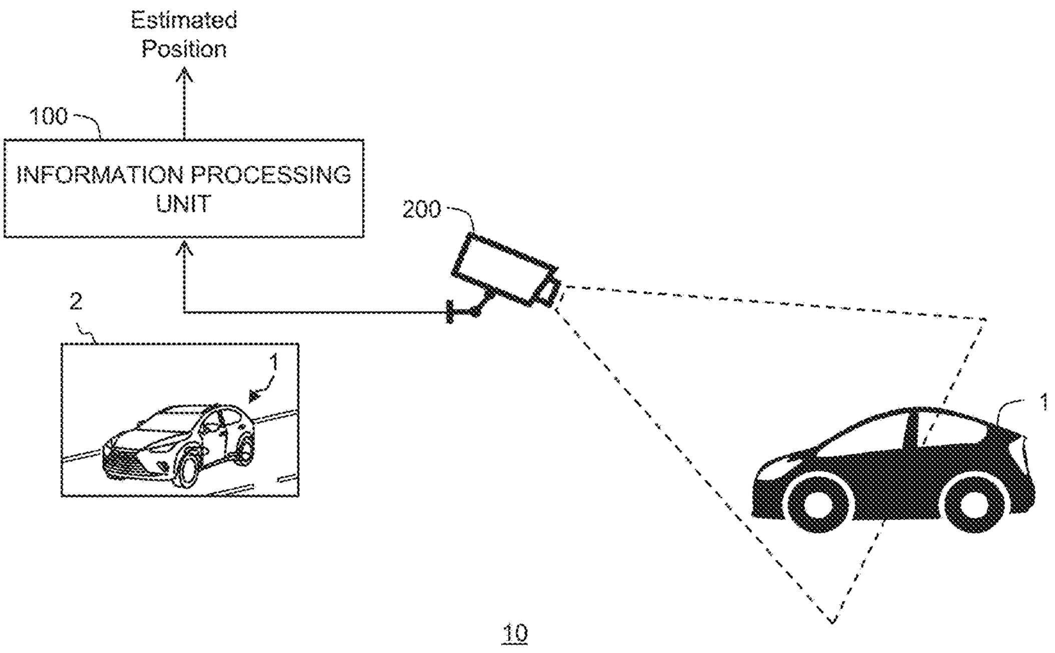
FIG. 1 is a diagram showing an outline of a vehicle position estimation system according to the present embodiment.

The vehicle position estimation system according to the present embodiment provides a vehicle position estimation function of estimating the position of a vehicle shown in a captured image captured by a camera. FIG. 1 is a diagram showing an outline of a vehicle position estimation system 10 according to the present embodiment. The vehicle position estimation system 10 includes an information processing unit 100 and a camera 200.

The camera 200 is installed so as to capture an image of the vehicle 1 to be estimated. The captured image 2 captured by the camera 200 is transmitted to the information processing unit 100.

The information processing unit 100 is a computer that executes processing related to a vehicle position estimation function. The information processing unit 100 acquires the captured image 2, executes processing, and outputs an estimated position of a vehicle 1 (hereinafter, also referred to as a "target vehicle 1") shown in the captured image 2. The estimated position indicates the position of the target vehicle 1 estimated in a predetermined world coordinate system. The world coordinate system may be suitably given according to the environment in which the vehicle position estimation system 10 is applied.

The vehicle position estimation system 10 may function as a part of various systems. For example, the vehicle position estimation system 10 may function as a part of the AVP system. In this case, for example, the target vehicle 1 is a vehicle that is parked by the AVP, and the estimated position is output to specify the position of the target vehicle 1 in the parking lot. The camera 200 is, for example, a camera installed in a parking lot where the AVP is executed. The world coordinate system is, for example, a coordinate system that provides a position in a parking lot.

Further, for example, the vehicle position estimation system 10 may function as a part of an autonomous driving system. In this case, for example, the target vehicle 1 is a vehicle that performs autonomous driving, and the estimated position is output for self-localization of the target vehicle 1. The camera 200 is, for example, an infrastructure camera installed to monitor the vehicle. The world coordinate system is, for example, a coordinate system that gives a position on a map.

1.2 Configuration of Vehicle Position Estimation Function

Figure 2:
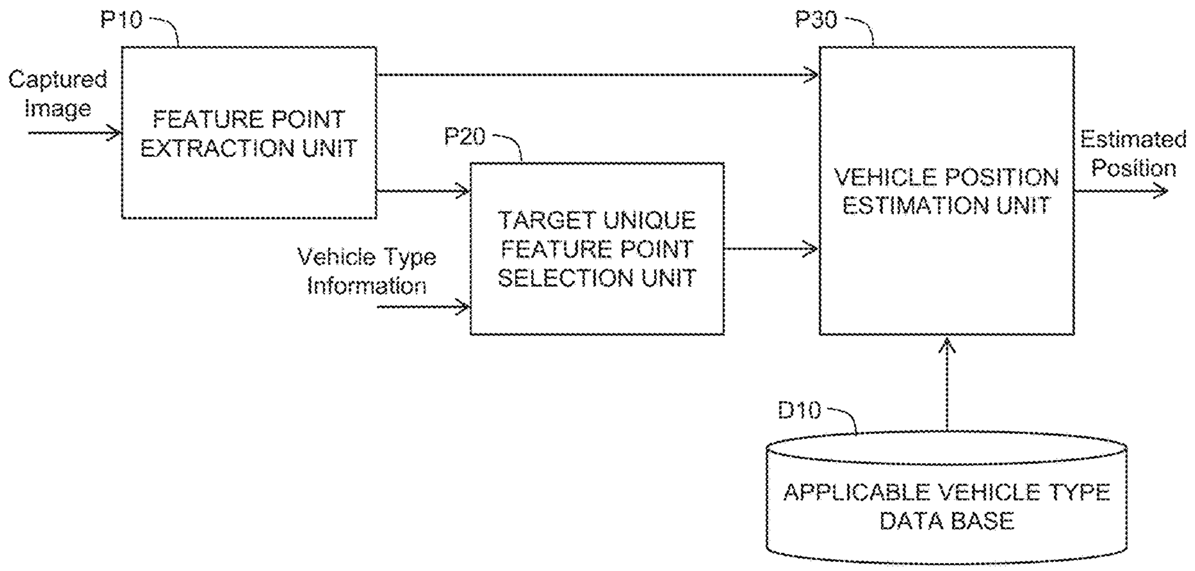
FIG. 2 is a diagram showing an example of a configuration of a vehicle position estimation function according to the first embodiment.

FIG. 2 is a diagram showing an example of a configuration of a vehicle position estimation function according to the present embodiment. The vehicle position estimation function is configured by a feature point extraction unit P10, a target unique feature point selection unit P20, and a vehicle position estimation unit P30. Each of the feature point extraction unit P10, the target unique feature point selection unit P20, and the vehicle position estimation unit P30 is realized by the information processing unit 100 executing processing.

The feature point extraction unit P10 acquires the captured image 2 and extracts feature points of the target vehicle 1 from the captured image 2. The extracted feature points are represented by image coordinates in the captured image 2. In particular, the feature points extracted by the feature point extraction unit P10 include universal feature points indicating feature points independent of the vehicle type and a plurality of types of unique feature points indicating feature points corresponding to a plurality of applicable vehicle types. The feature points can also be referred to as "key points". Each of the universal feature point and the unique feature point may include a plurality of feature points.

The universal feature point is a feature point that can be uniformly interpreted for various vehicles. For example, the universal feature points are four corners of a rectangular region indicating a road surface occupied by the target vehicle 1 or a ground contact surface of a tire. The unique feature point is a feature point optimized for the corresponding applicable vehicle type. For example, the unique feature point is a feature point related to a shape or a part unique to the corresponding applicable vehicle type.

The applicable vehicle type is a type of vehicle supported by the vehicle position estimation system 10, and may be suitably set according to an environment in which the vehicle position estimation system 10 is applied. For example, each of the plurality of applicable vehicle types may be classified by a body type of a vehicle (SUV, minivan, sedan, or the like), or may be classified by a product name of a vehicle. Further, for example, each of the plurality of applicable vehicle types may be classified by a predetermined classification number appropriately given according to the model, the specification, or the like.

Figure 3:
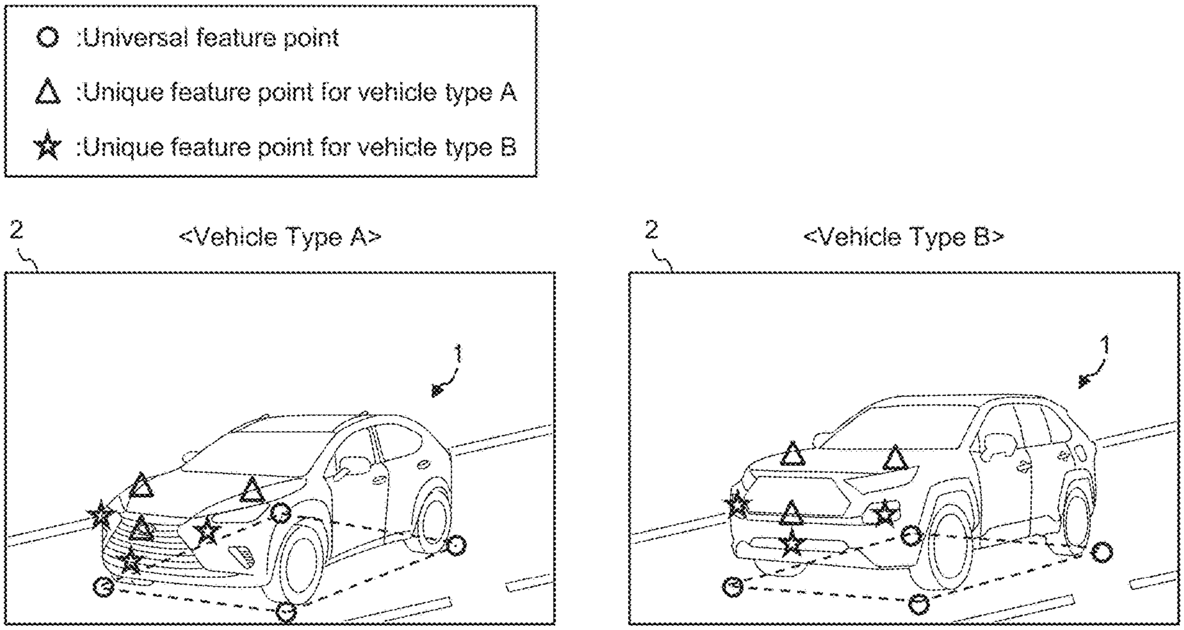
FIG. 3 is a diagram showing an example of extracted feature points.

FIG. 3 is a diagram showing an example of feature points of the target vehicle 1 extracted by the feature point extraction unit P10 when the applicable vehicle type is two of the vehicle type A and the vehicle type B. FIG. 3 illustrates an example of feature points extracted from the captured image 2 in which the target vehicle 1 is the vehicle type A and an example of feature points extracted from the captured image 2 in which the target vehicle 1 is the vehicle type B.

As illustrated in FIG. 3, for both of the captured image 2 in which the target vehicle 1 is the vehicle type A and the captured image 2 in which the target vehicle 1 is the vehicle type B, the universal feature point, the unique feature point related to the vehicle type A (unique feature point for vehicle type A), and the unique feature point related to the vehicle type B (unique feature point for vehicle type B) are extracted. Since the unique feature point for vehicle type A is optimized for the vehicle type A, the vehicle type region feature point gives a more accurate feature point for the captured image 2 in which the target vehicle 1 is the vehicle type A. On the other hand, the unique feature point for vehicle type B is optimized for the vehicle type B, and therefore, the captured image 2 in which the target vehicle 1 is the vehicle type B is given a more accurate feature point.

In the present embodiment, the feature point extraction unit P10 is configured by a learned model generated in advance by machine learning. That is, the feature point extraction unit P10 extracts the universal feature point and the plurality of types of unique feature points from the captured image 2 using the learned model. The learned model is generated so as to receive the captured image 2 as an input and output the universal feature point and the plurality of types of unique feature points in the input captured image 2. The configuration and generation method of the learned model will be described later.

Refer to FIG. 2 again. The target unique feature point selection unit P20 acquires the extracted multiple types of unique feature points. Then, the target unique feature point selection unit P20 selects a unique feature point (hereinafter, referred to as a "target unique feature point") suitable for the target vehicle 1 from among the plurality of types of unique feature points. In the first embodiment, the target unique feature point selection unit P20 acquires the vehicle type information of the target vehicle 1 and selects a unique feature point corresponding to the vehicle type of the target vehicle 1 as the target unique feature point. For example, when the target vehicle 1 is a vehicle type A, the target unique feature point selection unit P20 selects a unique feature point related to the vehicle type A from among the plurality of types of unique feature points as the target unique feature point.

The vehicle position estimation unit P30 may obtain the extracted universal feature point and the selected target unique feature point. The vehicle position estimation unit P30 accesses the applicable vehicle type database D10. The applicable vehicle type database D10 is a database for managing information related to each of a plurality of applicable vehicle types. In the present embodiment, the applicable vehicle type database D10 includes information that can specify the coordinates of each feature point in the vehicle-based vehicle coordinate system for each applicable vehicle type. For example, the applicable vehicle type database D10 manages coordinates of each feature point in the vehicle coordinate system, which are calculated in advance for each applicable vehicle type.

The vehicle position estimation unit P30 estimates the position of the target vehicle 1 based on the image coordinates of the universal feature point and the target unique feature point. The vehicle position estimation unit P30 can estimate the position of the target vehicle 1, for example, as follows.

The vehicle position estimation unit P30 can acquire the coordinates of each of the universal feature point and the target unique feature point in the vehicle coordinate system by accessing the applicable vehicle type data base D10. For example, the vehicle position estimation unit P30 acquires coordinates corresponding to the vehicle type of the target vehicle 1 from the applicable vehicle type database D10, and acquires coordinates by performing matching of feature points. Here, when the position of the target vehicle 1 in the world coordinate system is given, the coordinates of the universal feature point and the target unique feature point in the world coordinate system can be determined from the coordinates in the vehicle coordinate system. Further, the coordinates in the world coordinate system can be converted into coordinates in the image coordinate system by known coordinate conversion using camera parameters (a focal length, a distortion correction parameter, a camera position, a camera orientation, and the like) of the camera 200. That is, the vehicle position estimation unit P30 can calculate the coordinates of the universal feature point and the target unique feature point in the image coordinate system, assuming the position of the target vehicle 1. In this case, the vehicle position estimation unit P30 may calculate the coordinates of the image coordinate system by adding a constraint condition (for example, height=0 as a constraint condition of the road surface position).

Therefore, the vehicle position estimation unit P30 can estimate the position of the target vehicle 1 by solving a task of minimizing the difference between the image coordinates of the acquired universal feature point and target unique feature point and the image coordinates of the universal feature point and target feature point calculated when the position of the target vehicle 1 is assumed, with the position of the target vehicle 1 as an unknown.

For example, a case where the position of the target vehicle 1 is estimated in three dimensions of (X, Y, θ) is considered. At this time, the vehicle position estimation unit P30 can estimate the position of the target vehicle 1 by solving a task expressed by the following Equation (1). Here, (ui, vi) is the image coordinates of the acquired universal feature point or target unique feature point, (ui', vi') (X, Y, θ) is the image coordinates of the universal feature point or target unique feature point calculated when the position of the target vehicle 1 is (X, Y, θ), and wi is the weight for each feature point. For example, a small value is set for the universal feature point, and a large value is set for the unique feature point. The following Equation (1) can be applied to a case where the position of the target vehicle 1 is estimated in a higher dimension or a lower dimension. For example, the task can be configured in the same manner even in a case where the position of the target vehicle 1 is estimated in six dimensions of (X, Y, Z, yaw, pitch, roll).

Formula 1

$$\min_{(X,Y,\theta)} \sum_i w_i \left( \left\| (u_i, v_i) - (u_i', v_i')|_{(X,Y,\theta)} \right\| \right)^2 \quad (1)$$

As described above, the vehicle position estimation function according to the present embodiment is configured. The information processing unit 100 outputs the estimated position of the target vehicle 1 estimated by the vehicle position estimation unit P30.

1.3 Information Processing Unit

Figure 4:
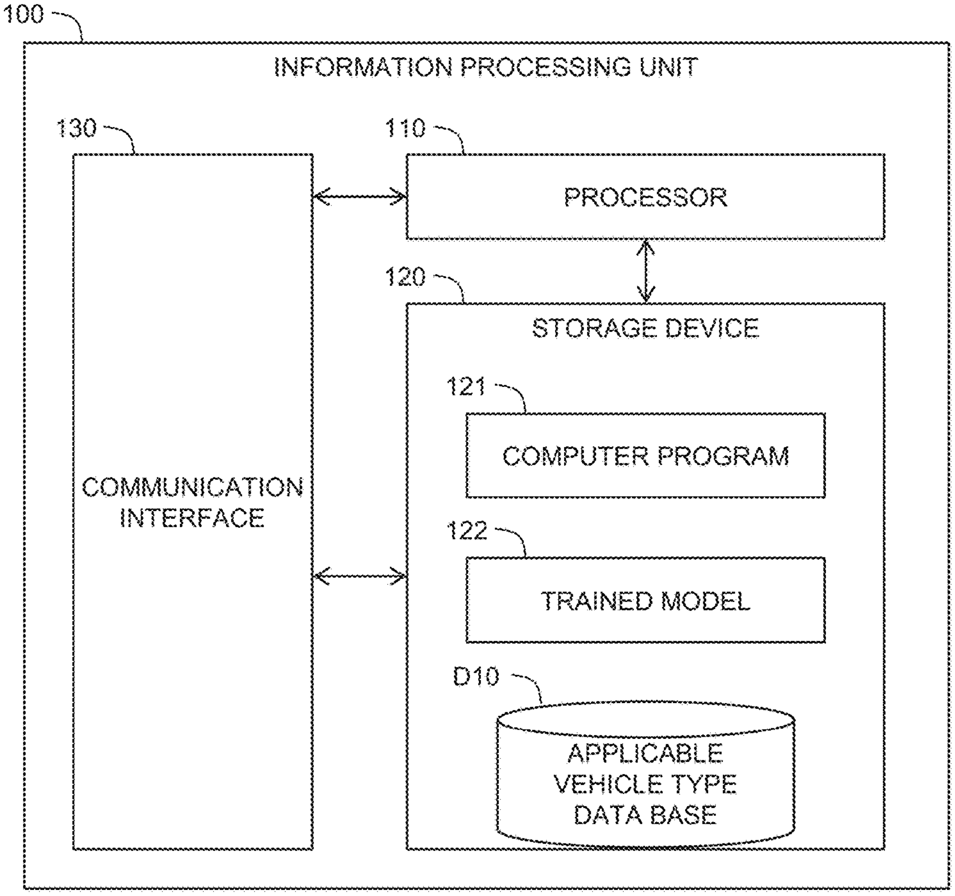
FIG. 4 is a diagram showing an example of a hardware configuration of an information processing unit according to the embodiment.

FIG. 4 is a diagram illustrating an example of a hardware configuration of the information processing unit 100. The information processing unit 100 includes one or more processors 110 (hereinafter, simply referred to as a processor 110 or processing circuitry), one or more storage devices (hereinafter, simply referred to as a storage device 120), and a communication interface 130.

The processor 110 executes various processes. The processor 110 may be configured by, for example, a central processing unit (CPU), a graphics processing unit (GPU), or the like.

The storage device 120 stores various kinds of information necessary for the processor 110 to execute processing. The storage device 120 may be configured by a recording medium such as a read only memory (ROM), a random-access memory (RAM), a hard disk drive (HDD), or a solid state drive (SSD).

The storage device 120 stores a computer program 121, a trained model 122, and an applicable vehicle type database D10.

The computer program 121 is executed by the processor 110. Various processes by the information processing unit 100 may be realized by cooperation between the processor 110 that executes the computer program 121 and the storage device 120. Specifically, a feature point extraction unit P10, a target unique feature point selection unit P20, and a vehicle position estimation unit P30 may be implemented. The feature point extraction unit P10, the target unique feature point selection unit P20, and the vehicle position estimation unit P30 may be implemented by a single processor 110 or may be implemented by separate processors 110. The computer program 121 may be recorded in a computer-readable recording medium. The processor 110 may configure the feature point extraction unit P10 by reading the trained model 122 from the storage device 120 and using the trained model 1310.

The communication interface 130 is an interface for connecting to and communicating with the outside of the information processing unit 100. Examples of the communication interface 130 include a device for connecting to the Internet and a device for connecting to a moving body communication network. The information processing unit 100 communicates with the camera 200 and the target vehicle 1 via the communication interface 130.

Figure 5:
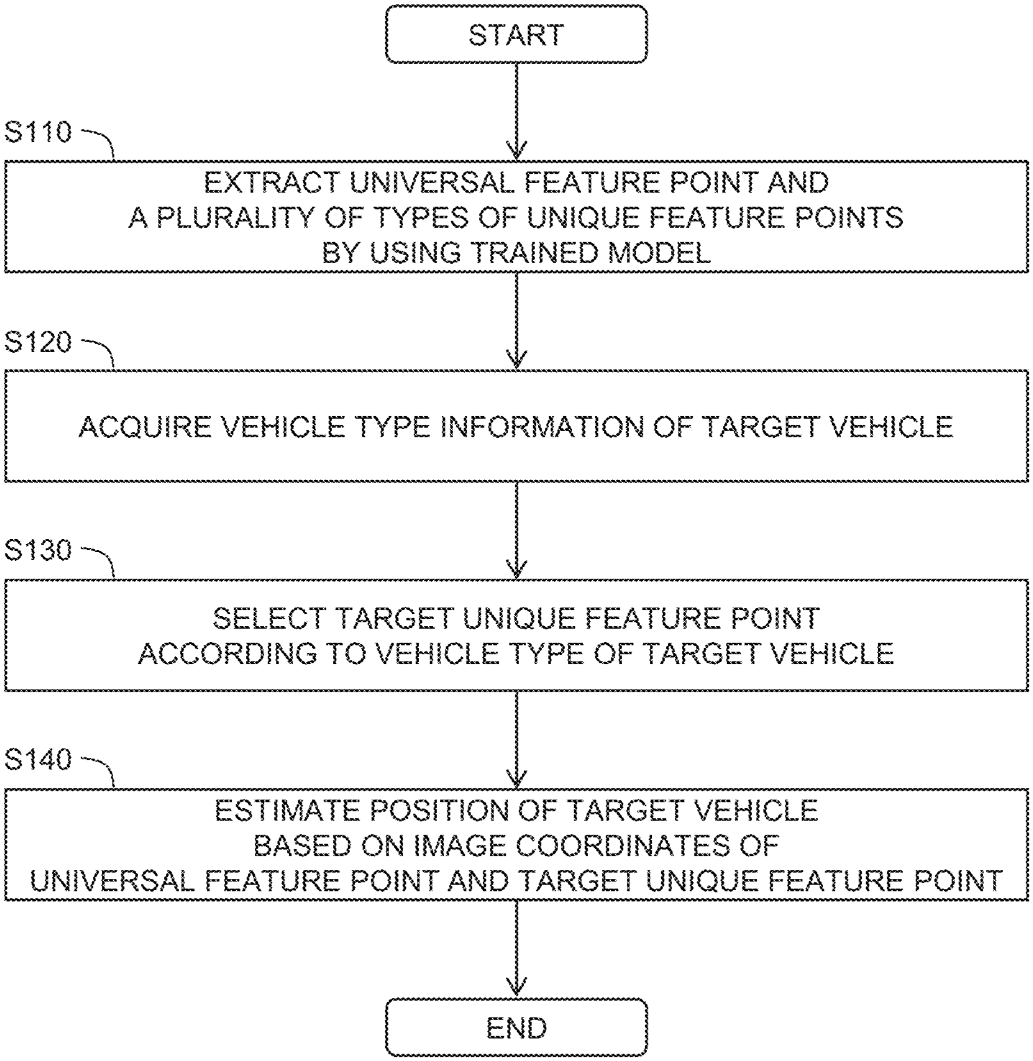
FIG. 5 is a diagram showing a process executed by the information processing unit according to the first embodiment.

FIG. 5 is a flowchart showing an example of processing executed by the information processing unit 100, more specifically, processing executed by the processor 110, based on the configuration described in "1.2 vehicle Position Estimation Function". The processing according to the flowchart illustrated in FIG. 5 is started, for example, when the information processing unit 100 acquires the captured image 2 from the camera 200.

In step S110, the processor 110 extracts a universal feature point and a plurality of types of unique feature points from the captured image 2 using the trained model 122.

Next, in step S120, the processor 110 acquires the vehicle type information of the target vehicle 1. The processor 110 may directly acquire the vehicle type information by communicating with the target vehicle 1, or may acquire the vehicle type information by performing image recognition on the captured image 2. Alternatively, the processor 110 may acquire the identification information of the target vehicle 1 by communicating with the target vehicle 1, and may acquire the vehicle type information by referring to the applicable vehicle type data base D10 using the identification information.

Next, in step S130, the processor 110 selects a target unique feature point from among the plurality of extracted unique feature points in accordance with the vehicle type of the target vehicle 1.

Next, in step S140, the processor 110 estimates the position of the target vehicle 1 based on the image coordinates of the extracted universal feature point and the selected target unique feature point. For example, the processor 110 estimates the position of the target vehicle 1 by solving the task expressed by the above-described Equation (1) using an extended Kalman filter, a Lagrange's method of undetermined multipliers, iterative processing by a solver, or the like. The estimated position of the target vehicle 1 is obtained by executing the processing related to step S140. After step S140, the process is terminated.

The vehicle position estimation function according to the present embodiment is realized by the processor 110 executing the processing in this way. The vehicle position estimation program according to the present embodiment is realized by the computer program 121 that causes the processor 110 to execute the processing in this way.

1.4 Learned Model

Figure 6:
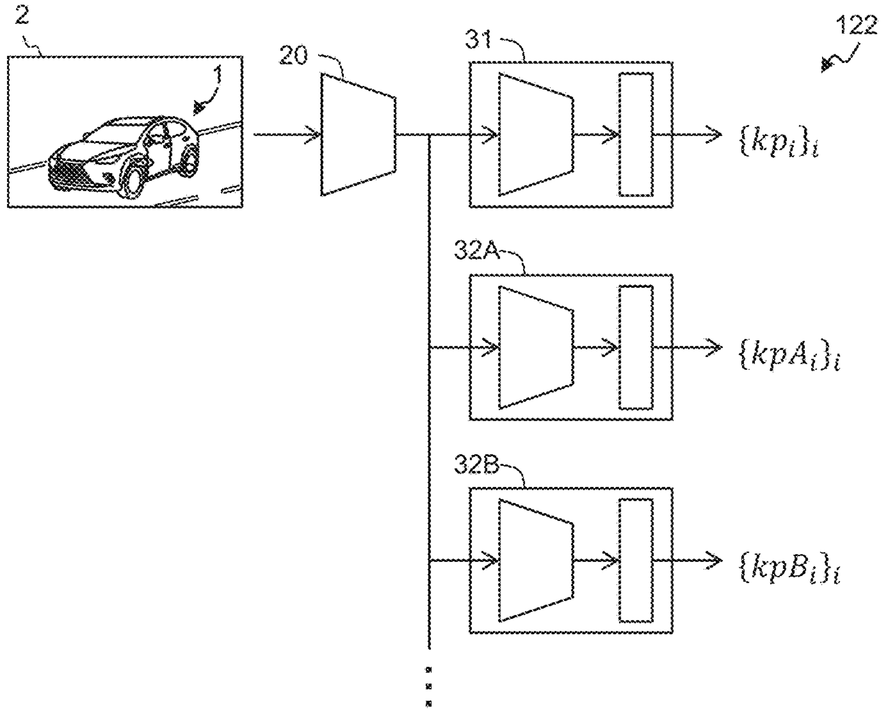
FIG. 6 is a diagram for explaining a learned model according to the present embodiment.

Hereinafter, the trained model 122 for extracting the feature points of the target vehicle 1 from the captured image 2 will be described. FIG. 6 is a diagram for explaining the configuration of the trained model 122.

The trained model 122 includes an upper layer 20, a universal feature point extraction layer 31, and a plurality of unique feature point extraction layers corresponding to a plurality of applicable vehicle types.

The upper layer 20 receives the captured image 2 as an input and outputs the feature amount of the captured image 2. The upper layer 20 may adopt a convolutional neural network (CNN), a transformer model, or the like. In the trained model 122, the captured image 2 can be considered as a "target image" from which feature points are extracted.

The universal feature point extraction layer 31 receives the output of the upper layer 20 and outputs a universal feature point. In FIG. 6, $\{kp_i\}_i$ indicates a universal feature point to be output. The universal feature point extraction layer 31 is configured by, for example, a feature amount extraction unit for extracting a feature amount suitable for extraction of a universal feature point from the output of the upper layer 20, and an output unit for outputting the image coordinates of the universal feature point from the output of the feature amount extraction unit. In this case, the universal feature point extraction layer 31 may employ a CNN, a transformer model, or the like as a feature amount extraction unit. Further, as the output unit, an affine layer, a SoftMax layer, or the like may be employed.

Each of the plurality of unique feature point extraction layers receives the output of the upper layer 20 as an input and outputs a unique feature point according to the corresponding applicable vehicle type. In FIG. 6, a unique feature point extraction layer 32A and a unique feature point extraction layer 32B are illustrated. For example, the unique feature point extraction layer 32A corresponds to the vehicle type A, and outputs the unique feature point $\{kpA_i\}_i$ related to the vehicle type A. The unique feature point extraction layer 32B corresponds to the vehicle type B and outputs the unique feature point $\{kpB_i\}_i$ of the vehicle type B. Each of the plurality of unique feature point extraction layers is configured by, for example, a feature amount extraction unit for extracting a feature amount suitable for extraction of a unique feature point corresponding to the applicable vehicle type from the output of the upper layer 20, and an output unit for outputting image coordinates of the unique feature point corresponding to the applicable vehicle type from the output of the feature amount extraction unit. In particular, the unique feature point extraction layers may have the same configuration.

Although two unique feature point extraction layers 32A and 32B are shown in FIG. 6, the plurality of unique feature point extraction layers may include three or more unique feature point extraction layers. As understood from the above description, even when three or more unique feature point extraction layers are included, the same trained model 122 can be configured.

Figure 7:
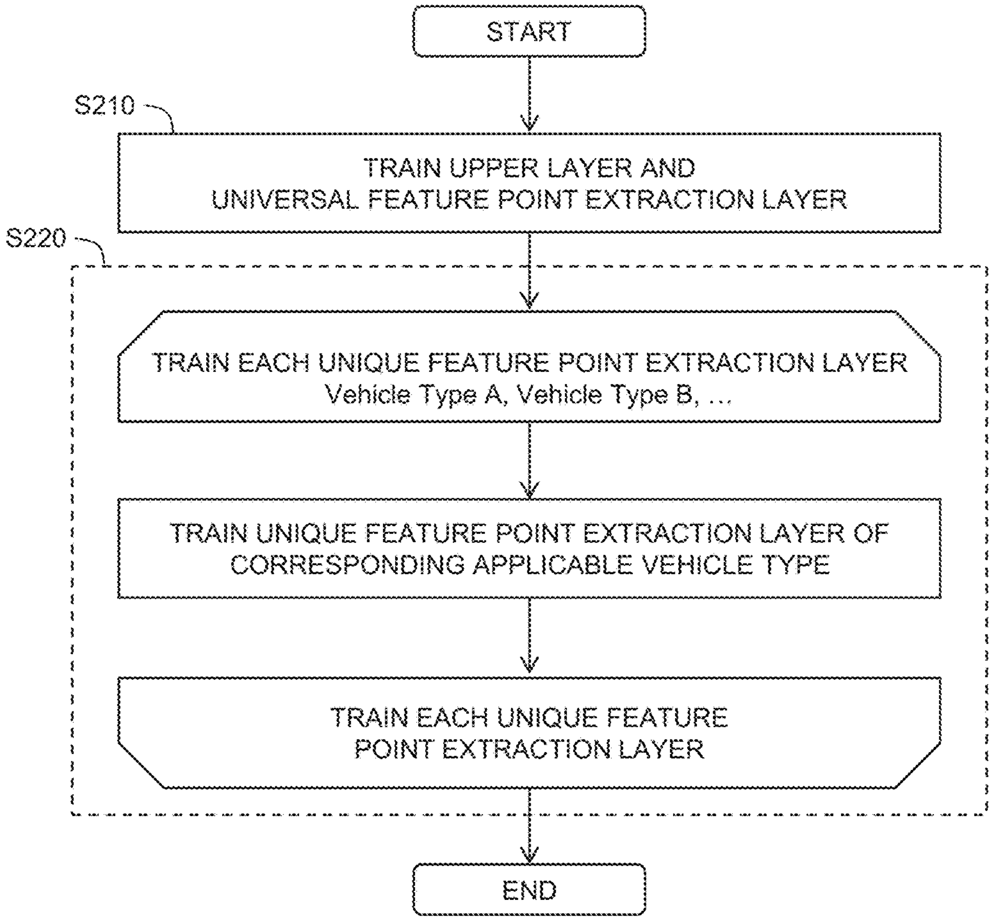
FIG. 7 is a diagram showing a generation method for generating the learned model according to the present embodiment.

As described above, the trained model 122 according to the present embodiment is configured. The trained model 122 is generated in advance by machine learning. FIG. 7 is a flowchart showing a method of generating the trained model 122. The process according to the flowchart illustrated in FIG. 7 is executed by the processor 110 at the time of learning, for example.

First, in step S210, learning of the upper layer 20 and the universal feature point extraction layer 31 is performed. The learning of the upper layer 20 and the universal feature point extraction layer 31 is performed by training data (hereinafter, also referred to as "general-purpose training data") including a plurality of images in which various vehicles of which the vehicle type is not designated are shown. The training data may include information on a feature point that is a correct answer. The generic training data may utilize, for example, a large data set. The learning of the upper layer 20 and the universal feature point extraction layer 31 can be performed by, for example, the backpropagation method. At this time, learning of the upper layer 20 and the universal feature point extraction layer 31 may be integrally performed.

By performing learning using the general-purpose training data, the upper layer 20 and the universal feature point extraction layer 30 are expected to output results with high generalization performance for various vehicles. In particular, it is possible to prepare a large amount of training data as general-purpose training data, and it is possible to expect learning with a high proficiency level.

Next, in step S220, learning of each of the plurality of unique feature point extraction layers is performed. Learning of each unique feature point extraction layer is performed by training data including a plurality of images in which a vehicle of the corresponding applicable vehicle type appears. For example, learning of the unique feature point extraction layer related to the vehicle model A is performed by training data including a plurality of images in which a vehicle of the vehicle model A appears. Learning of each unique feature point extraction layer can be performed by the backpropagation method in the same manner. At this time, learning may be performed in a state in which the upper layer 20 and the unique feature point extraction layer of the learning target are connected. However, in order to maintain the learning result of the upper layer 20 by the general-purpose training data, it is desirable to freeze the parameters related to the upper layer 20 in the learning of each unique feature point extraction layer.

As the learning of each of the plurality of unique feature point extraction layers is performed in this way, each unique feature point extraction layer is expected to output a result optimized for the corresponding applicable vehicle type. In particular, considering that the upper layer 20 is learned with a high proficiency by the general-purpose training data, each unique feature point extraction layer can perform learning with a high proficiency even with a relatively small amount of training data. In addition, highly efficient learning can be performed.

After step S220, the process is terminated. By executing the processing in this way, the method of generating the trained model 122 according to the present embodiment is realized.

According to the trained model 122 of the present embodiment, it is easy to extend the applicable vehicle type afterward. For example, it is assumed that the applicable vehicle type is two of a vehicle type A and a vehicle type B. Then, a case where the vehicle type C is newly added as the applicable vehicle type is considered. At this time, the unique feature point extraction layer for the vehicle type C may be newly connected to the upper layer 20 to configure the trained model 122. The universal feature point extraction layer 31 or another unique feature point extraction layer may be used as the unique feature point extraction layer for the vehicle type C. The trained model 122 may be learned only for the unique feature point extraction layer of the vehicle type C. As described above, by using the trained model 122 according to the present embodiment, it is possible to realize the vehicle position estimation system 10 in which the applicable vehicle type can be easily expanded afterward.

1.5 Effect

As described above, according to the present embodiment, since the position is estimated based on the image coordinates of the target unique feature point optimized for the vehicle type of the target vehicle 1 in addition to the universal feature point, it is possible to realize a vehicle position estimation function with high estimation accuracy.

2. Second Embodiment

Hereinafter, the vehicle position estimation system 10 according to the second embodiment will be described. The vehicle position estimation system 10 according to the second embodiment provides a vehicle position estimation function, as in the first embodiment. In the following description, differences from the first embodiment will be mainly described, and the contents common to the first embodiment will be appropriately omitted.

2.1 Configuration of Vehicle Position Estimation Function

Figure 8:
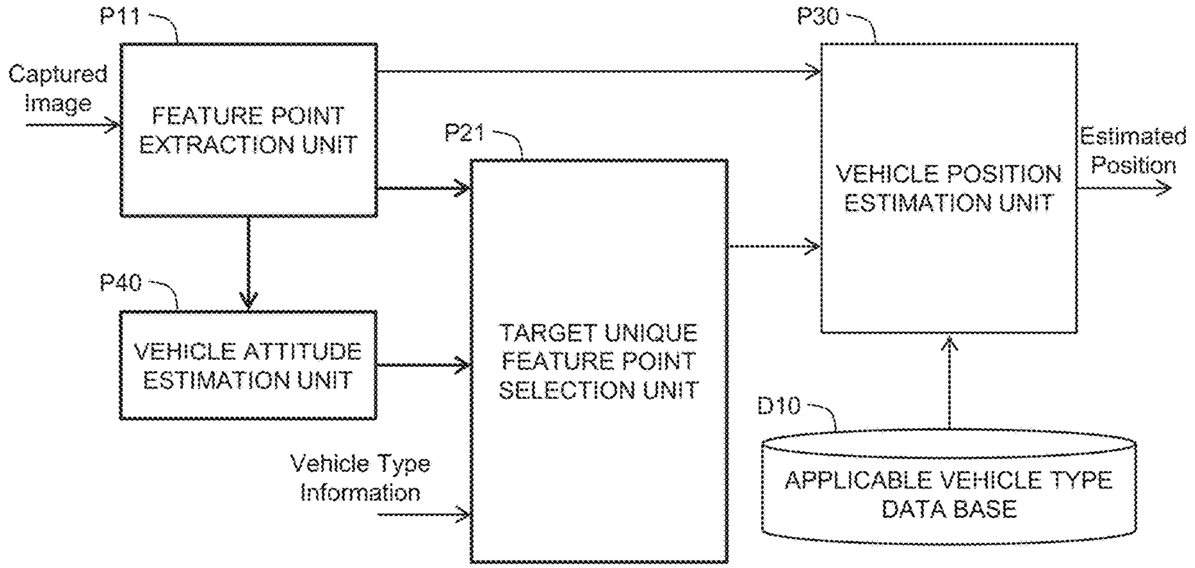
FIG. 8 is a diagram showing an example of a configuration of the vehicle position estimating function according to the second embodiment.

FIG. 8 is a diagram showing an example of a configuration of a vehicle position estimation function according to the second embodiment. The vehicle position estimation function according to the second embodiment is configured by a feature point extraction unit P11, a target unique feature point selection unit P21, a vehicle position estimation unit P30, and a vehicle attitude estimation unit P40. In FIG. 8, the same reference numerals are given to the same elements as those of the first embodiment.

The feature point extraction unit P11 extracts a universal feature point and a plurality of types of unique feature points from the captured image 2. In particular, in the second embodiment, each of the plurality of types of unique feature points extracted by the feature point extraction unit P11 includes a plurality of types of attitude-specific feature points classified according to the attitude of the vehicle. Here, the "posture of the vehicle" is a posture of the vehicle when viewed from the camera 200, and indicates whether the vehicle is facing forward or backward in the captured image 2. The elevation-specific feature point may include a plurality of feature points.

The attitude-specific feature point is a feature point further optimized for the corresponding posture of the vehicle among the unique feature points. For example, when the attitude X indicates that the vehicle is facing forward in the captured image 2, the attitude-specific feature point related to the attitude X is a feature point related to a shape or a component that is well reflected when the vehicle is facing forward.

The feature point extraction unit P11 is configured by the trained model 122, as in the first embodiment. Therefore, in the trained model 122, each of the plurality of unique feature point extraction layers is configured to output a unique feature point including a plurality of kinds of the elevation-specific feature points. For example, the unique feature point extraction layer for the vehicle type A is configured to output the attitude-specific feature point $\{kpAX_i\}_i$ for the vehicle attitude X and the attitude-specific feature point $\{kpAY_i\}_i$ for the vehicle attitude Y.

The vehicle attitude estimation unit P40 estimates the vehicle attitude of the target vehicle 1. For example, the vehicle attitude estimation unit P40 acquires the extracted universal feature point and estimates the attitude of the target vehicle 1 based on the image coordinates of the universal feature point. When the universal feature points are at the four corners of the rectangular region, the vehicle attitude estimation unit P40 estimates the attitude of the target vehicle 1 from the shape of the rectangular region represented by the universal feature points, for example. The vehicle attitude estimation unit P40 may estimate the attitude of the target vehicle 1 by image recognition of the captured image 2. Further, for example, the vehicle attitude estimation unit P40 may estimate the attitude of the target vehicle 1 by tracking the target vehicle 1.

The target unique feature point selection unit P21 further acquires the attitude information of the target vehicle 1 from the vehicle attitude estimation unit P40. In the second embodiment, the target unique feature point selection unit P21 selects a unique feature point corresponding to the vehicle type of the target vehicle 1 from among the plurality of types of unique feature points, and selects an attitude-specific feature point corresponding to the attitude of the target vehicle 1 from among the plurality of types of attitude-specific feature points included in the selected unique feature point as the target unique feature point. That is, in the second embodiment, the target unique feature point is a feature point suitable for both the vehicle type and the posture of the target vehicle 1.

2.2 Information Processing Unit

Figure 9:
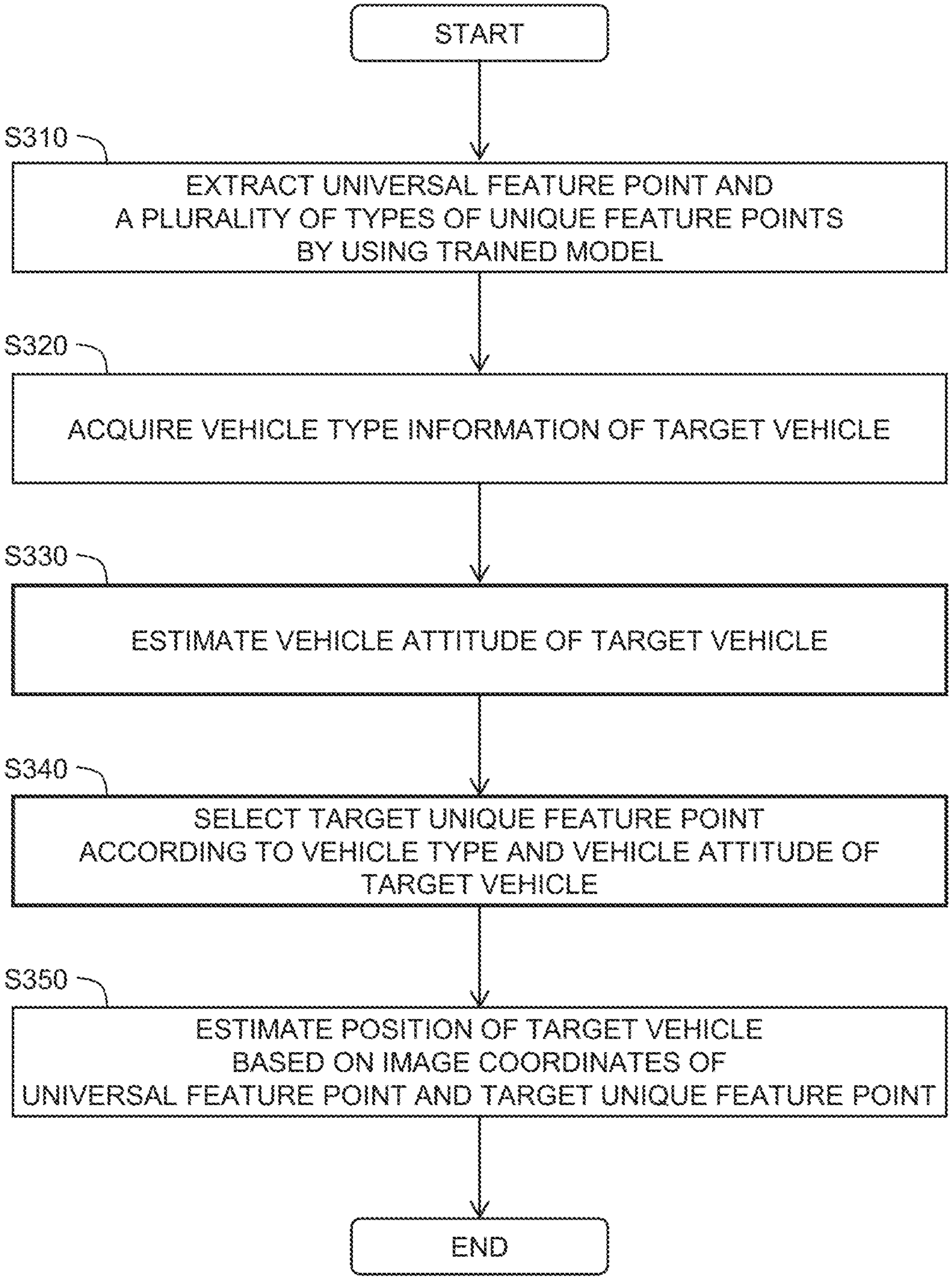
FIG. 9 is a diagram showing a process executed by the information processing unit according to the second embodiment.

FIG. 9 is a flowchart showing an example of processing executed by the information processing unit 100, more specifically, processing executed by the processor 110, based on the configuration described in "2.1 vehicle Position Estimation Function".

The step S310 and the step S320 are equivalent to the step S110 and the step S120 described in FIG. 5, respectively. After step S320, the process proceeds to step S330.

In step S330, the processor 110 estimates the posture of the target vehicle 1.

Next, in step S340, the processor 110 selects a target unique feature point from among the extracted unique feature points in accordance with the vehicle type and the posture of the target vehicle 1.

Next, in step S350, the processor 110 estimates the position of the target vehicle 1 based on the image coordinates of the extracted universal feature point and the selected target unique feature point. The estimated position of the target vehicle 1 is obtained by executing the processing related to step S350. After step S350, the process is terminated.

2.3 Effect

As described above, according to the second embodiment, the position is estimated based on the image coordinates of the target unique feature point optimized for the posture of the target vehicle 1, which is more optimized than the first embodiment, and thus it is possible to realize the vehicle position estimation function with higher estimation accuracy.

2.4 Modification

The vehicle position estimation system 10 according to the second embodiment may be modified as follows.

In the modification, the feature point extraction unit P11 is configured such that each of the extracted plural types of unique feature points includes plural feature points to which reliabilities varying according to the attitude of the vehicle are given, instead of plural types of attitude-specific feature points. For example, when five feature points of kpA1, kpA2, kpA3, kpA4, and kpA5 are extracted as unique feature points related to the vehicle type A, the reliability is given to each feature point as follows. The reliability may be given to the class of each feature point by a map prepared in advance. In this case, the map may be generated from a past position estimation result, a conformity test, or the like.

TABLE 1

| | Vehicle Attitude X | Vehicle Attitude Y |
|---|---|---|
| kpA1 | 90% | 30% |
| kpA2 | 90% | 30% |
| kpA3 | 70% | 60% |
| kpA4 | 20% | 80% |
| kpA5 | 25% | 85% |

In the modification, the target unique feature point selection unit P21 is configured to select a unique feature point corresponding to the vehicle type of the target vehicle 1 from among the plurality of types of unique feature points as a target unique feature point, and further exclude a feature point having a reliability lower than a threshold value from the target unique feature point based on the posture of the target vehicle 1. For example, it is assumed that the target vehicle 1 is a vehicle type A and the target unique feature point selection unit P21 selects the unique feature point of the vehicle type A as the target unique feature point. It is also assumed that the threshold value is 40%. At this time, the target unique feature point selection unit P21 executes processing so as to exclude kpA1 and kpA2 from the target unique feature points.

Thus, in the vehicle position estimation unit P30, the position of the target vehicle 1 can be estimated based on the feature points having sufficient reliability with respect to the posture of the target vehicle 1. Furthermore, the same effects as those described above can be achieved by adopting such a modified aspect.

What is claimed is:

1. A vehicle position estimation system comprising:

a camera; and processing circuitry configured to estimate a position of a target vehicle shown in an image captured by the camera, wherein the processing circuitry is configured to execute:

extracting a universal feature point of the target vehicle and a plurality of unique feature points of the target vehicle from the captured image using a trained model generated in advance by machine learning, the universal feature point being a feature point independent of vehicle type, and the plurality of unique feature points respectively corresponding to a plurality of applicable vehicle types;

acquiring information on the vehicle type of the target vehicle;

selecting a target unique feature point from the plurality of unique feature points according to the vehicle type of the target vehicle indicated by the acquired information, the target unique feature point providing a more accurate feature point for the target vehicle than another unique feature point of the plurality of unique feature points that corresponds to another type of the plurality of applicable vehicle types; and estimating the position of the target vehicle based on image coordinates of the universal feature point and the target unique feature point.

2. The vehicle position estimation system according to claim 1, wherein the trained model includes:

an upper layer that receives the captured image as input;

a universal feature point extraction layer that receives an output of the upper layer as input and outputs the universal feature point; and a plurality of unique feature point extraction layers corresponding to the plurality of applicable vehicle types, each of which receives the output of the upper layer as input and outputs, according to the corresponding applicable vehicle type, a unique feature point of the plurality of unique feature points, the upper layer and the universal feature point extraction layer have been trained using first training data, the first training data configured of a plurality of images showing various vehicles without specifying the vehicle type, and each of the plurality of unique feature point extraction layers has been trained using second training data, the second training data configured of a plurality of images showing vehicles of the corresponding applicable vehicle type.

3. The vehicle position estimation system according to claim 1, wherein each of the plurality of unique feature points includes a plurality of attitude-specific feature points classified according to vehicle attitude, the processing circuitry is further configured to execute acquiring information on the vehicle attitude of the target vehicle, and the selecting the target unique feature point includes:

selecting a unique feature point corresponding to the vehicle type of the target vehicle from the plurality of unique feature points; and selecting, as the target unique feature point, an attitude-specific feature point corresponding to the vehicle attitude of the target vehicle from the plurality of attitude-specific feature points included in the selected unique feature point.

4. The vehicle position estimation system according to claim 1, wherein each of the plurality of unique feature points includes a plurality of feature points to which a reliability that varies depending on vehicle attitude is given, the processing circuitry is further configured to execute acquiring information on the vehicle attitude of the target vehicle, and the selecting the target unique feature point includes:

selecting, as the target unique feature point, a unique feature point corresponding to the vehicle type of the target vehicle from the plurality of unique feature points; and excluding one or more feature points whose reliability is less than a threshold value from the plurality of feature points included in the target unique feature point based on the vehicle attitude of the target vehicle.

5. A generation method for generating a trained model for causing a computer to extract feature points of a vehicle shown in a target image, wherein the trained model includes:

an upper layer that receives the target image as input;

a universal feature point extraction layer that receives an output of the upper layer as input and outputs a universal feature point of the vehicle, the universal feature point being a feature point independent of vehicle type; and a plurality of unique feature point extraction layers corresponding to a plurality of applicable vehicle types, each of which receives the output of the upper layer as input and outputs a unique feature point of the vehicle corresponding to one of the plurality of applicable vehicle types, a unique feature point of the plurality of output unique feature points that corresponds to a first type of the applicable vehicle types providing a more accurate feature point for a vehicle of the first type than another unique feature point of the plurality of unique feature points that corresponds to a second type of the applicable vehicle types, and the generation method includes:

training the upper layer and the universal feature point extraction layer by using first training data, the first training data configured of a plurality of images showing various vehicles without specifying vehicle type; and training each of the plurality of unique feature point extraction layers by using second training data, the second training data configured of a plurality of images showing vehicles of the corresponding applicable vehicle type.

* * * * *